Sept. 9, 1969  G. R. ADAMS  3,466,528
INVERTER FOR INDUCTION HEATING USE
Filed Aug. 29, 1967  5 Sheets-Sheet 1

INVENTOR.
GRAHAM R. ADAMS
BY
Meyer, Tilberry & Body
ATTORNEYS

Sept. 9, 1969  G. R. ADAMS  3,466,528
INVERTER FOR INDUCTION HEATING USE
Filed Aug. 29, 1967  5 Sheets-Sheet 3

INVENTOR.
GRAHAM R. ADAMS
BY
Meyer, Tilberry & Body
ATTORNEYS

Sept. 9, 1969  G. R. ADAMS  3,466,528
INVERTER FOR INDUCTION HEATING USE
Filed Aug. 29, 1967  5 Sheets-Sheet 4

INVENTOR.
GRAHAM R. ADAMS
BY
Meyer, Tilberry & Body
ATTORNEYS

United States Patent Office 3,466,528
Patented Sept. 9, 1969

3,466,528
INVERTER FOR INDUCTION HEATING USE
Graham R. Adams, Warrensville Heights, Ohio, assignor to Park-Ohio Industries, Inc., Cleveland, Ohio, a corporation of Ohio
Filed Aug. 29, 1967, Ser. No. 664,077
Int. Cl. H02m 7/44, 7/68
U.S. Cl. 321—45                     2 Claims

ABSTRACT OF THE DISCLOSURE

A resonant bridge inverter is modified to place the predominant inductance of the resonant circuit in the common bridge branch of the inverter and a small part of the inductance of the resonant circuit in series with the silicon controlled rectifiers of each switching leg of the inverter.

---

This invention pertains to the art of induction heating and more particularly to an improved inverter for induction heating applications.

The invention is particularly applicable for use in an induction heating installation, and it will be described with particular reference thereto; however, it is appreciated that the invention has much broader applications and may be used in various other installations having power requirements similar to that experienced in induction heating.

Induction heating apparatus have been used for many years in various industrial applications. These apparatus generally include an inductor surrounding, or adjacent to, a workpiece and a power supply for passing an alternating current through the inductor to induce circulating heating currents in the workpiece. In the past, motor-generator sets have been used extensively to power the inductor, especially when relatively low frequencies are required. Higher frequencies have necessitated the use of electronic power supplies, usually in the form of an oscillator. Both motor-generator sets and oscillators have been quite successful in induction heating; however, with the advent of various solid state electronic devices, there has been considerable effort devoted to the development of a solid state power supply for introducing an alternating current into the inductor of an induction heating installation. Some of these solid state devices have taken the form of harmonic voltage triplers or multipliers wherein a three phase input is converted into a single phase output having a frequency higher than the input frequency. Also, it has been suggested that an inverter, which converts direct current into an alternating output, could be used for induction heating. The present invention is directed toward an improvement in such an inverter.

At this time, the most promising solid state inverter for use in induction heating is the resonant bridge inverter. This inverter generally incorporates a bridge circuit having a central, common branch through which currents are passed in opposite directions by gating separate pairs of silicon controlled rectifiers in spaced switching legs or branches. Usually four such switching legs or branches are provided to control the flow of current through the central bridge branch of the inverter. The silicon controlled rectifiers are shunted by inversely positioned diodes and a commutating capacitor is placed in the common branch of the bridge. By gating two selected silicon controlled rectifiers, current flows through the capacitor in a given direction. By incorporating inductances in series with the gated silicon controlled rectifiers or in the common branch of the inverter, a series resonant circuit is established when either set of switching legs are conductive. Consequently, as the two selected silicon controlled rectifiers are turned "on," a resonant system is created between the inductances in the switching legs and the commutating capacitor. This causes the current through the common branch of the inverter to be somewhat sinusoidal due to the exchange of current and energy between the capacitor and the inductors or inductances. When the current attempts to flow in a direction reverse to the forward direction of the silicon controlled rectifiers, the current flows through the shunting diodes. This reverse current through the shunting diode turns "off" or commutates the silicon controlled rectifiers and blocks further flow of current through these controlled rectifiers until they are subsequently gated while subjected to a forward bias. Thereafter, the other two legs of the bridge, also having silicon controlled rectifiers, are gated "on" so that current having the same basic electrical characteristics passes through the common branch of the bridge, but in the opposite direction. By controlling the silicon controlled rectifiers, one set is "on" while the other is commutated "off." This creates a generally sinusoidal wave in the common branch of the inverter. By connecting this common branch of the inverter with an induction heating load, an alternating current is imposed upon the load.

The inverter as described above has proved to be adapted for induction heating. The voltage applied across the silicon controlled rectifiers that are turned "off" or non-conducting is the vector summation of the supply voltage for the inverter and the voltage of the adjacent leg branch of the inverter bridge. As the induction heating load changes, the component of forward voltage is generally increased which can result in damage to the non-conducting silicon controlled rectifiers. For this reason, the silicon controlled rectifiers must be selected with a higher forward voltage rating than is actually necessary during normal operation of the inverter. This substantially limits the output power which can be obtained from a given inverter and increases the total cost of an inverter for a selected application. This problem was overcome by placing the resonant inductance in the common branch of the inverter; however, this was not completely satisfactory because commutation of the SCR's was more critical and short circuits could result. Transients and wave distortions were also more severe.

The present invention is directed toward a modification of the above-described inverter, which modification substantially reduces the forward voltage applied to the non-conducting silicon controlled rectifiers without making the commutation critical.

In accordance with the present invention, there is provided an inverter of the type described above wherein the structure which coacts with the commutating capacitor of the inverter to provide current through the diodes for turning the gated silicon controlled rectifiers "off" is divided into a large portion placed within the common branch of the inverter bridge and smaller portions placed in the legs of the inverter. In this manner, the supply voltage and only a small portion of the inductive voltage are applied in a forward direction across the non-conducting silicon controlled rectifiers. In addition, the gating of the various silicon controlled rectifier parts is less critical because the exchange of energy between the inductance and capacitance of the bridge circuit takes place in the common branch of the bridge circuit and not in the switching legs or branches including the silicon controlled rectifiers. Also, the small inductance in the legs or the inverter maintain a current flow through the shunting diodes, even after the other set of SCR's are turned "on." Consequently, it is possible to turn one pair of silicon controlled rectifiers "on" slightly before the other pair is turned "off." During this short interval when all of the silicon controlled rectifiers are "on," current is not applied in a forward direction through the silicon controlled rectifiers which are to be turned "off" because the energy from the capacitor is being absorbed primarily by the inductor or inductance within the common branch of the inverter and the leg inductance slows down the drop in current through the shunting diodes. This gives an additional delay before current flow reverses to a forward direction through the silicon controlled rectifiers which are by now non-conducting. Any person skilled in the art of inverters would readily appreciate the advantages resulting from the modification of the normal resonant bridge inverter as adapted to induction heating applications.

The primary object of the present invention is the provision of a resonant bridge inverter for an induction heating installation, which inverter is somewhat economical to produce, reliable in operation, and adapted for use in a variety of induction heating installations.

Another object of the present invention is the provision of a resonant bridge inverter for induction heating installation, which is less load sensitive than prior similar inverters.

Still another object of the present invention is the provision of a resonant bridge inverter for an induction heating installation, which inverter includes silicon controlled rectifiers in the legs of the bridge and reduces the voltage across the non-conducting silicon controlled rectifiers within the bridge without distracting substantially from proper commutation.

These and other objects and advantages will become apparent from the following description used to illustrate the preferred embodiment of the invention as read in connection with the accompanying drawings in which.

Figure 1:
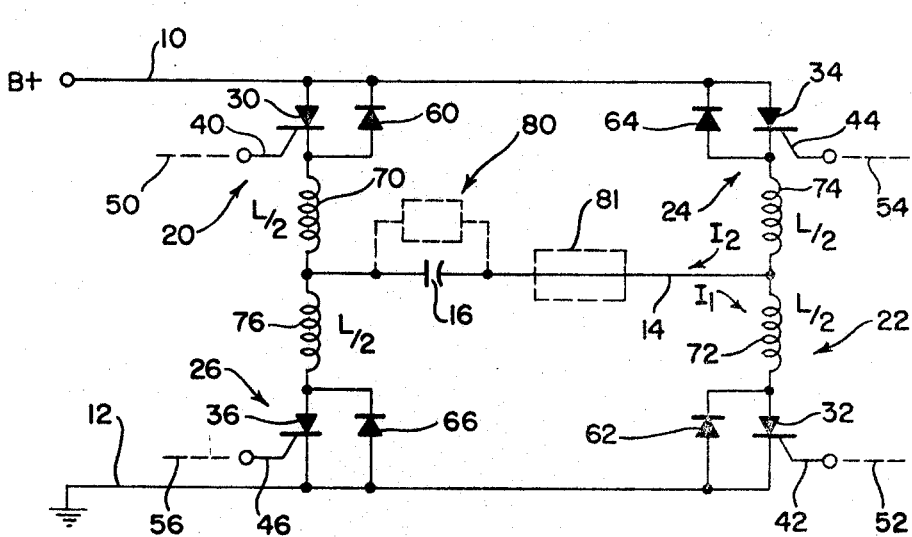
FIGURE 1 is a wiring diagram illustrating, somewhat schematically, an inverter to which the present invention is particularly adapted for use.

Referring now to the drawings wherein the showings are for the purpose of illustrating preferred embodiments of the invention only and not for the purpose of limiting same, FIGURE 1 shows a somewhat standard resonant bridge inverter A utilized for converting a substantially D.C. power supply (not shown) connected across output leads 10, 12 into an approximately 3,000 cycle alternating current output. This inverter includes a common bridge branch 14 in which there is positioned a commutating capacitor 16. First and second bridge legs 20, 22 coact to form a first path through branch 14; and, third and fourth bridge legs 24, 26 form a second path through this same branch, but in a direction opposite to the path of the first set of legs. Silicon controlled rectifiers 30, 32, 34 and 36, hereinafter referred to as "SCR's" are positioned in a forward biased relationship within the various bridge legs. In other words, the SCR's are inserted into the inverter A with the same basic polarity so that current can flow through the SCR's when they are properly gated by gates 40, 42, 44 and 46, respectively. Gating, which renders the SCR's conductive, is controlled by signals 50, 52, 54 and 56 from a source schematically shown in FIGURE 6. If a gating signal is received by an SCR when a forward bias is applied thereto, the SCR becomes conductive and remains conductive until the current flow through the SCR becomes quite low. To accomplish this, each of the SCR's has a shunting diode, i.e., diodes 60, 62, 64 and 66, respectively. Each of these diodes is connected in opposite sense to the SCR's so that current will flow through the diodes in a direction opposite to current flow through the SCR's. This will tend to reduce the current flow through the SCR's and turn the SCR's "off" for subsequent gating. Of course, current flow in the reverse direction cannot occur in the SCR's.

As previously mentioned, the inverter A is a resonant bridge inverter. The capacitor 16 coacts with leg inductances 70 and 72 or inductances 74 and 76 to provide a series resonant system according to the particular SCR's which are conducting at any given time. As illustrated, each of the inductances, or inductors, comprises one-half of the total inductance L of the system being operated. This inverter A has previously been used by coupling a load 80 in parallel with the capacitor 16 so that the current and voltage characteristics of the load are determined by the voltage characteristics across the capacitor. Primarily, this inverter was adapted for fluorescent lighting installations. This inverter A has also been used by coupling a schematically illustrated, load 81 alternately positioned in series with the capacitor, so that the load voltage and current are determined by the load impedance and the series alternating current present in the bridge common leg 14. Parallel connected load 80 has better inherent voltage regulation while series connected load 81 makes more efficient use of the SCR's power capabilities.

Figure 2:
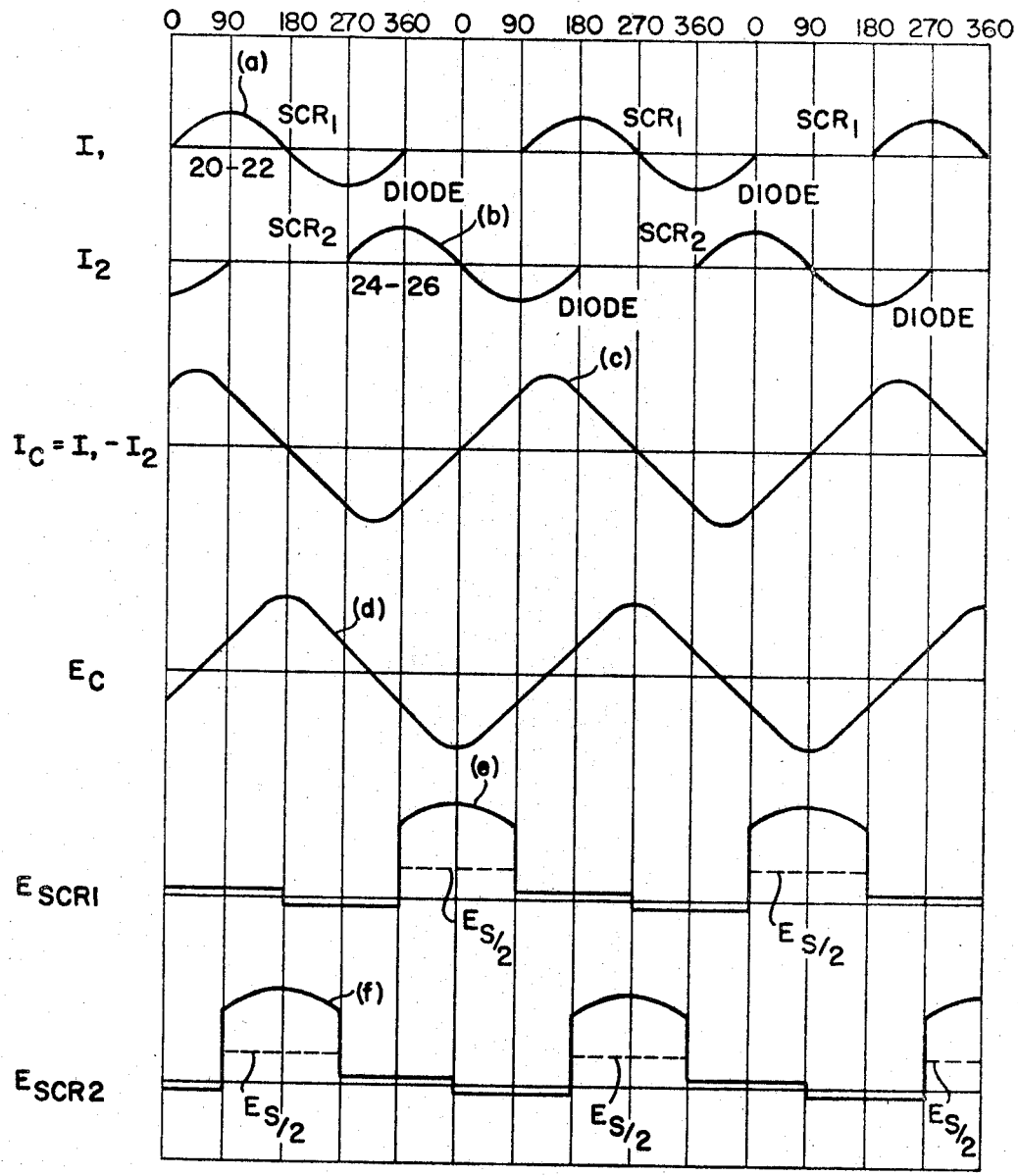
FIGURE 2 is a graph illustrating, somewhat schematically, certain operating characteristics of the inverter illustrated in FIGURE 1.

Referring now to FIGURE 2, certain operating characteristics of the inverter A are illustrated graphically and only in a representative fashion. The upper curve $a$ represents the current flow through the silicon controlled rectifier set 30, 32 and the capacitor at no load conditions. When the SCR's 30, 32 are gated, current flows through the legs 20, 22, which includes the inductances or inductors 70, 72 and the capacitor 16. This provides a current flow $I_1$ through the SCR's. As the current $I_1$ swings below zero, the SCR's 30, 32 cannot carry current in this direction. At this time, the diodes 60, 62 carry the remaining half cycle of current flow. During this half cycle, a negative bias is applied to the SCR's 30, 32 and they are rendered non-conductive, i.e., they turn "off." As the current $I_1$ tends to go positive it is blocked by the non-conducting SCR's 30, 32. This is clearly illustrated in curve $a$. Referring now to curve $b$, the SCR's 34, 36 of legs or branches 24, 26 are gated "on" at approximately the peak current position of diodes 60, 62. This assures that the SCR's 30, 32 have been rendered non-conductive and that a generally sinusoidal output curve is obtained. This second curve $b$ illustrates the current $I_2$ through the legs 24, 26. Thus, the SCR sets are alternately gated to provide alternate operation of the two SCR sets with current flowing basically in opposite directions through the branch 14.

The vectorial subtraction of the currents $I_1$ and $I_2$, as illustrated in curves $a$ and $b$, is represented by curve $c$. This is a curve of the current flow through the branch 14. Since the current through the capacitor 16 is nearly sinusoidal, and since the no-load operation of the inverter A represents nearly an ideal capacitive reactance at the capacitor, the voltage across the capacitor is nearly sinusoidal. This is illustrated in curve $d$ of FIGURE 2. By constructing an inverter as illustrated in FIGURE 1, the SCR's 30, 32 are non-conductive when the voltage shown in curve $d$ is a maximum. This applies a relatively large forward voltage across the non-conducting SCR's 30, 32, as shown in curve $e$. This high voltage is increased by the voltage $E_s$, which represents the voltage of the supply. The same is true of the forward bias across SCR's 34, 36, shown in curve $f$. Consequently, a relatively large forward voltage is applied periodically across the non-conducting SCR's of the inverter A. For this reason, a high voltage capacity is necessary to prevent damage during operation of the inverter.

Figures 3, 4:
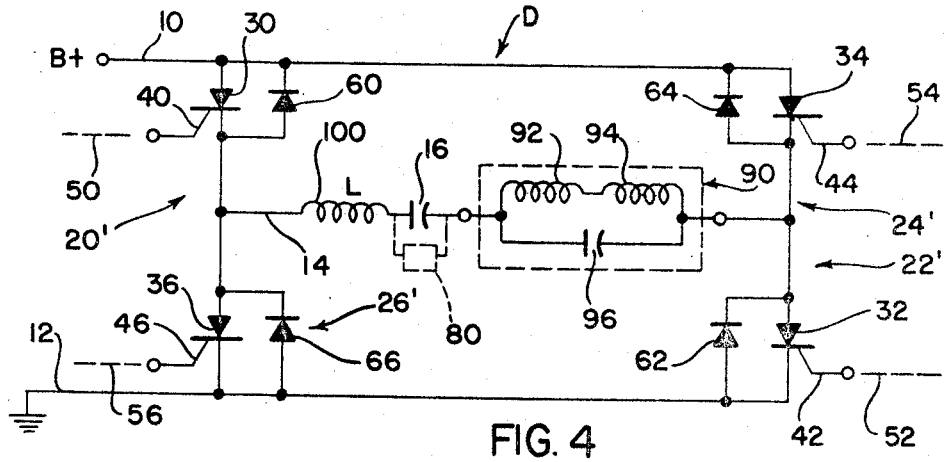
FIGURE 3 is a graph illustrating further operating characteristics of the inverter illustrated in FIGURE 1.
FIGURE 4 is a wiring diagram illustrating, somewhat schematically, another inverter for which the present invention is an improvement.

The problem mentioned above is further complicated by the fact that the inverter A is relatively load responsive. Referring now to FIGURE 3, the same basic curves as illustrated in FIGURE 2 are repeated in only partial form. The currents $I_1$ and $I_2$ are illustrated for high load conditions. It is noted that these currents have relatively large positive components and relatively small negative (diode) components. These negative components are sufficient to turn the various SCR's "off"; however, these currents cause a relatively high voltage across the capacitor 16. As illustrated in curve $f'$ these high voltages are applied in a forward direction across the non-conducting SCR's. For this reason, under load conditions, the inverter A establishes relatively high forward voltages across the non-conducting SCR's of the inverter. This either limits the amount of load which can be applied to the inverter or requires larger capacity SCR's. Certain transient voltages are also created which generate still higher forward voltages across the non-conducting SCR's. This is one of the disadvantages of the prior inverters which is overcome by the present invention.

Figure 5:
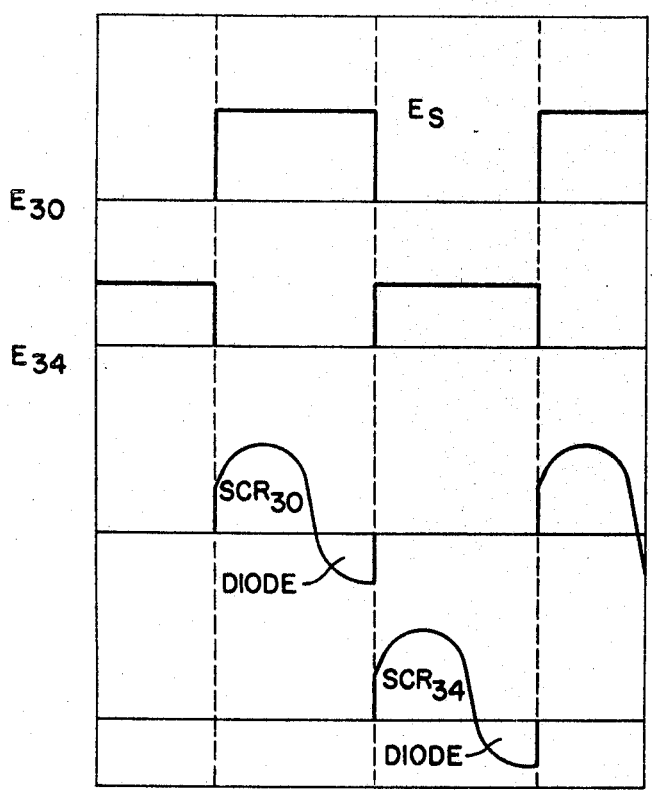
FIGURE 5 is a graph illustrating an operating characteristic of the inverter illustrated in FIGURE 4.

Another prior resonant bridge inverter is illustrated in FIGURE 4 wherein the inverter B has components similar to those used in inverter A. For simplicity, like components bear like numbers. An induction heating load 90, which may be graphically illustrated as resistance 92, inductance 94 and capacitance 96, is directly connected, as shown, into the branch 14 in series with capacitor 16. As shown in FIGURE 1, the load 90 may also be connected in parallel with the capacitor 16. The inductances are removed from legs 20', 22', 24' and 26'. Consequently, the resonant exchange of energy takes place between the capacitor 16 and the inductance 100 within the branch 14. In inverter B, relatively high forward voltages on the non-conducting SCR's are eliminated. The only forward voltage across the non-conducting SCR's is the voltage $E_s$ from the D.C. power supply. This concept is illustrated in FIGURE 5 which is a graph of the forward voltage across the non-conducting SCR 30. The voltage through the load remains substantially similar to that illustrated in connection with the description of inverter A without imposing the alternating current voltages across the non-conducting SCR's. Steep current waves thus produced are extremely undesirable.

Figure 6:
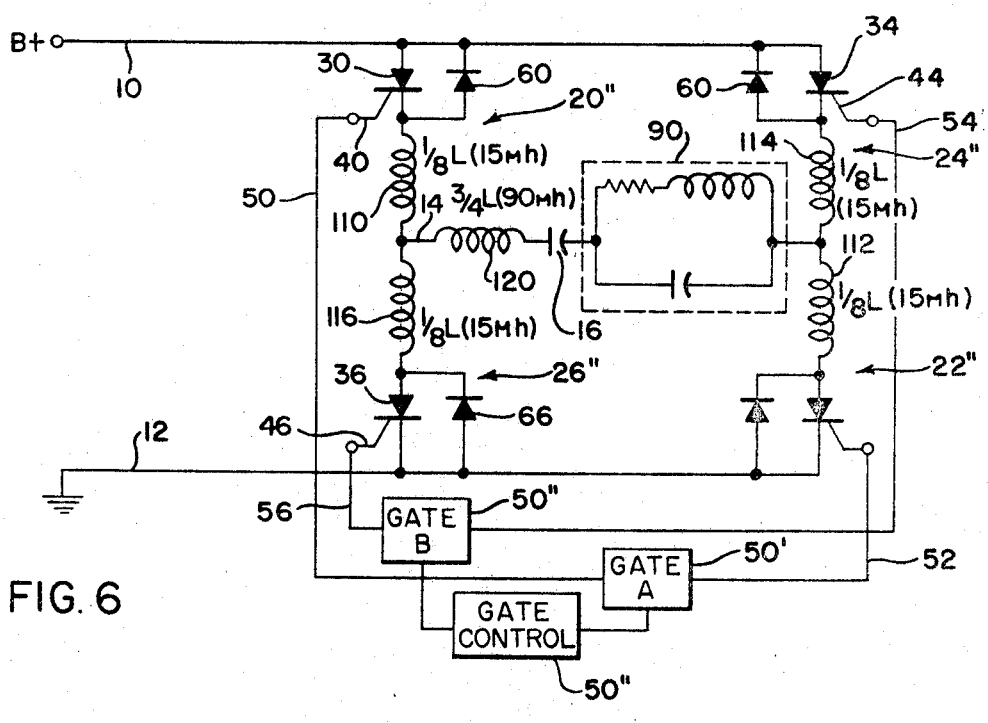
FIGURE 6 is a wiring diagram illustrating, somewhat schematically, the preferred embodiment of the present invention.

Referring to FIGURE 6, the preferred embodiment of the present invention is illustrated wherein an inverter C has components similar to those shown in FIGURES 1 and 4. Like numbers are used to designate like components. In accordance with this embodiment, the gating signals 50, 52 are provided by a gating device 50' having a conventional construction. The gating signals 54, 56 are provided with a gating device 50''. The sequence of operation of the gating devices 50', 50'' is controlled by an appropriate device represented as block 50'''. In accordance with the present invention, a small portion of the inductance for creating the resonant system remains within the inverter legs. These inductances are numbered 110, 112, 114 and 116, respectively. They are, as shown, one-eighth of the total inductance L required for the resonant system when either set of SCR's are conductive. The other three-fourths of the total inductance L is provided with a primary inductance or inductor 120 located within branch 14 in a manner similar to inductor 100 of FIGURE 4. The relative values between the leg inductances and the branch inductances may be varied; however, a ratio of less than 1:3 has proven satisfactory. In practice the ratio is, as illustrated in FIGURE 6, 1:6.

Figure 7:
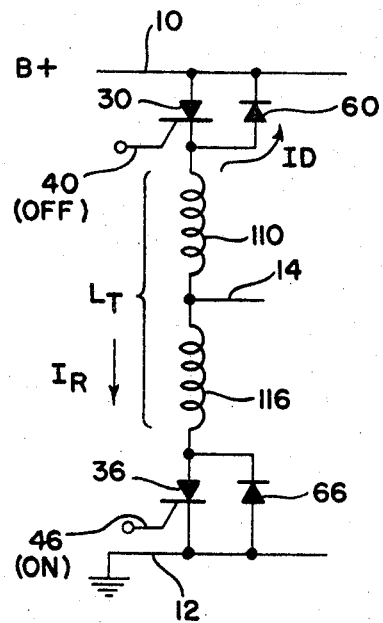
FIGURE 7 is a partial wiring diagram illustrating an operating characteristic of the embodiment of the invention shown in FIGURE 6.

The inductors 110, 112, 114 and 116 control the rate of change of current in the respective legs. This is primarily important when reverse current is flowing in one of the diodes. As will be explained later, these leg inductors maintain the reverse current flow for a controlled time after the other SCR's have been fired. FIGURE 7 illustrates this feature of the present invention. Assuming that SCR 30 has been gated into conduction and the current flow of the resonant system has reversed, SCR 30 will be turned "off," and current $I_D$ will be flowing through diode 60. This current flow must be maintained for a period sufficient to commutate the SCR 30. This period varies with different SCR's; however, it is generally at least 25–40 microseconds for available high power SCR's. If the opposite SCR 36 is gated into conduction, a low impedance path is created across this SCR, and a current $I_R$ tends to flow. If the inductors 110, 116 were not in the circuit, as illustrated, $I_D$ would drop to zero at once. Thus, if the time when SCR 36 is gated is less than the time for commutating SCR 30, a direct short would occur between lines 10, 12 and the SCR's could be destroyed. This does not occur if the inductance of both inductors 110, 116 is sufficiently high to maintain the current $I_D$ for a period that will positively commutate the "off" going SCR 30.

The equation for the time at which $I_D$ decreases to zero after gating of SCR 36 is approximately $$0 = E_s/L_T(t) - I_{D_0}$$

wherein $E_s$ is the supply voltage, $L_T$ is the total inductance of inductors 110, 116, $(t)$ is the expired time and $I_{D_0}$ is the initial current level of $I_D$. In one practical embodiment $E_s$ is approximately 200 volts and $L_T$ is approximately 30 microhenries. If it is assumed that $I_{D_0}$ is 50 amperes, the above formula could be written as follows:

$$\frac{200(t)}{30 \times 10^{-6}} = 50 \text{ or } \frac{50 \times 30 \times 10^{-6}}{200} = 7.5 \times 10^{-6}$$

Thus, $(t)$ would be 7.5 microseconds. This amount of additional time is provided for commutating the SCR 30 after SCR 36 has been gated "on." If a reduction were made in the ratio of the inductances of inductor 110 to the inductance of inductor 120 to approximately 1:18, inductor 120 would be the primary resonant component and the inductors 110, 112, 114 and 116 would be primarily used to prevent instantaneous drop of current $I_D$, with the time $(t)$ being about 2.5 microseconds which represents a safe $di/dt$ rate.

Figure 8:
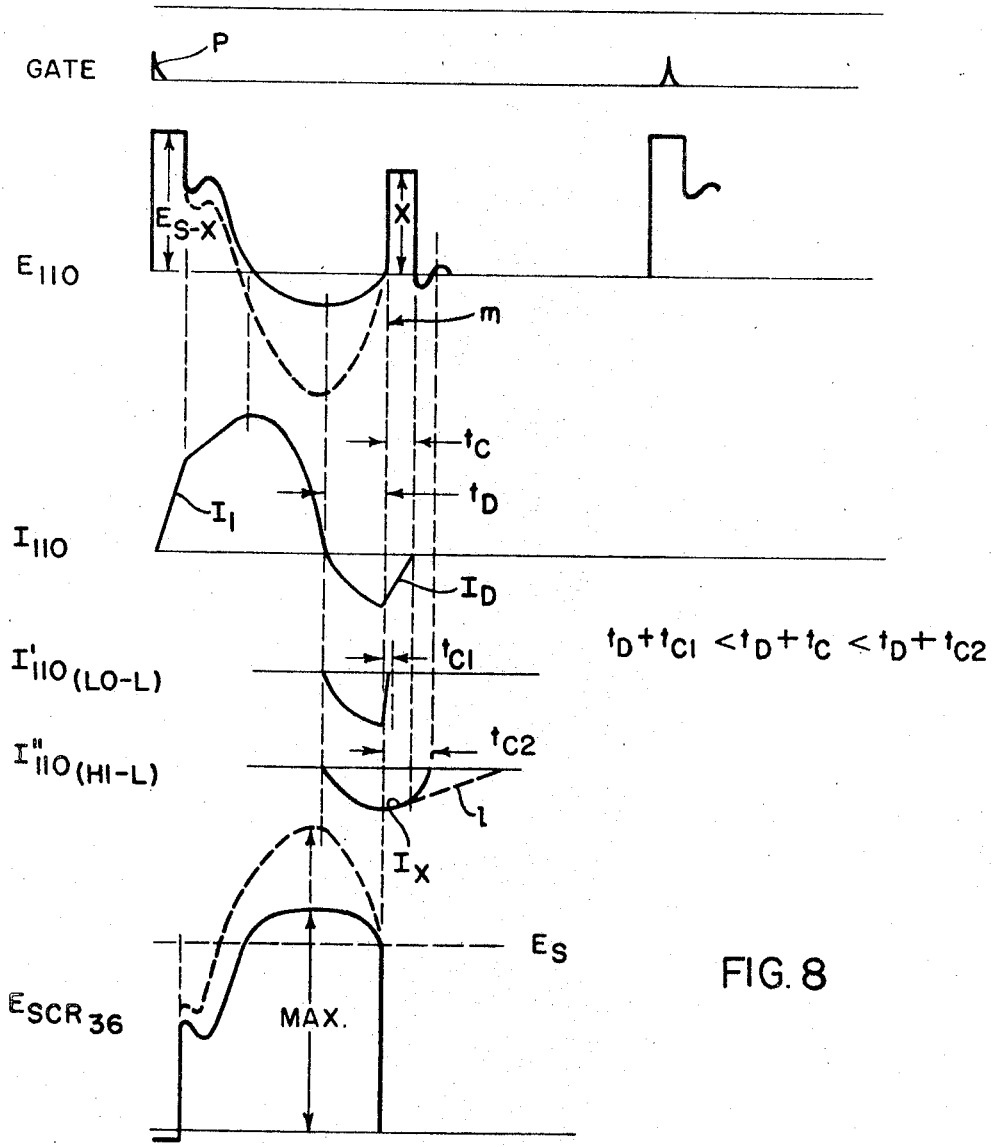
FIGURE 8 is a graph illustrating certain operating characteristics of the embodiment of the invention as shown in FIGURE 6.

Certain steady state operating characteristics of the preferred embodiment of the invention are shown in FIGURE 8. The top curve is the gating signal for SCR's 30, 32, the second curve $E_{110}$ is the voltage across the inductor 110 and the third curve $I_{110}$ is the current through leg 20''. When SCR's 30, 32 are gated by pulse P, the current $I_{110}$ raises in a straight line. This gives a constant voltage $E_s - X$ for $E_{110}$. Thereafter, $I_{110}$ becomes about sinusoidal. $E_{110}$ is proportional to $di/dt$; therefore, $E_{110}$ appears as shown. At point $m$, SCR's 34, 36 are gated while $I_D$ is still flowing. As explained before, $I_D$ then drops to zero at a rate determined approximately by the ratio of $E_s$ and $L_T$. This provides a constant $di/dt$; thus, $E_{110}$ is constant at a value X. It is seen that $(E_s - X)$, the level of the first peak of $E_{110}$ and X, the level of the second peak of $E_{110}$, when added equals $E_s$. The total supply voltage appears in the circuit including SCR's 30 and 36 or 32 and 34. The width of the second peak is $t_c$ which must be sufficient for commutation. Curve $I'_{110}$ represents a small inductance in inductors 110, 116. In this case, $t_{c1} < t_c$ and may not be sufficient for commutation. As this inductance approaches zero, the drop in current $I_D$ becomes more nearly critical. $T_D$ is the time for the current $I_D$ to reverse its slope.

Curve $I''_{110}$ represents a situation where the inductances of inductors 110 and 116 are high. In this case the current $I_D$ tends to drop along line 1; however, the sinusoidal current of the resonant system has a more rapid drop. Accordingly, $I_D$ tends to follow the driving current $I_x$, as shown.

In view of the above discussion, it is one feature of the present invention that the leg inductors be sufficiently large to provide a slope for $I_D$ or $di/dt$ rate which is safe for the switching devices used in the circuit. The remainder of the resonant inductance can be incorporated in the common branch 14. As previously mentioned, this limits the forward voltage of a non-conducting SCR, as shown in curve $E_{SCR\ 36}$ of FIGURE 8. The forward voltage on SCR 36, when it is non-conductive, is approximately the vectorial subtraction of the voltage $E_{110}$ from the supply voltage $E_s$. Thus, the maximum forward voltage is the summation of the supply voltage and the maximum negative swing of curve $E_{110}$. This value of maximum voltage is relatively low and most of the resonant inductance is in branch 14. The dashed lines in curves $E_{110}$ and $E_{SCR\ 36}$ represents the increase in voltages when more of the inductance is shifted into the bridge legs. Since the amount of inductance placed in the switching legs is determined by the $di/dt$ capabilities of the devices used and the total circuit inductance is determined by the desired power level and operating frequency there is no optimum ratio that applies to all cases. The ratios indicated in the preferred embodiment, FIGURE 6, are appropriate for 3K cycles operation at approximately 7 kw. power level. In practice a ratio of 1:3 has proven to be approaching a minimum ratio for 3K cycles; however, as the output frequency is varied, the desired ratio may change.

In summation, the present invention contemplates the location of enough inductance in the legs to assure safe $di/dt$ values while maintaining the remainder of the inductance in the bridge common branch to minimize forward voltage on the non-conducting SCR's. This invention has been discussed in connection with one preferred embodiment; however, various changes could be made in this embodiment without departing from the intended spirit and scope of the present invention. For instance, although a full wave bridge is discussed, various half wave bridge and center tape load configurations are possible which may also be improved with this invention.

Having thus described my invention, I claim:

1. In an inverter adapted for powering an induction heating load, said inverter including a D.C. supply having a level $E_s$ and with first and second output leads, a bridge branch with first and second ends, a commutating capacitor and an induction heating load connected in said bridge branch, a first switching leg connecting said first lead with said first end of said branch, a second switching leg connecting said second lead with said second end of said branch, a third switching leg connecting said first lead with said second end of said branch, a fourth switching leg connecting said second lead with said first end of said branch, a SCR having a commutating time and a reversely connected diode in a parallel circuit in each of said legs, means for alternately gating the SCR's of a first pair of legs including the first and second legs and a second pair of legs including the third and fourth legs for alternately energizing said branch by said legs, inductive reactance devices having selected inductances to coact with said commutating capacitor to create a series resonant system alternately through said first and second legs and said third and fourth legs, whereby alternating current is created in alternating forward and reverse directions through each of said parallel circuits, means for gating the SCR's of one pair of legs when a voltage in the forward direction is applied across the SCR's of these legs, said SCR's of said one pair being commutated by said applied current in the reverse direction for a time $t$ during which time $t$ a reverse current $I_D$, increasing to a value $I_{DO}$ in time $t_D$ and then decreasing to zero in time $t_C$, flows in said reverse direction through said diodes of said parallel circuits in said one pair of legs, time $t$ being greater than said commutating time of SCR's, the natural value of the time $t_C$ caused by the alternating current in said bridge branch and with infinite inductance in said legs being $t_{C2}$, the improvement comprising: means for modifying said time $t_C$ to a value $t_{C1}$ wherein $t_{C1}+t_D$ is at least equal to said commutating time of said SCR's and less than said natural value $t_{C2}$, said modifying means comprises said inductive devices including a primary inductive reactance device in said bridge branch and separate inductors each having a value $L$, one of said inductors being positioned in each of said legs, $L$ being sufficiently low so that $t_{C1}$ when determined by the formula:

$$t_{C1} = I_{DO} . 2L/E_S$$

will be lower than $t_{C2}$ and at least equal to $t_C$.

2. The improvement as defined in claim 1 wherein $t_{C1}$ equals at least 2.5 microseconds.

References Cited

UNITED STATES PATENTS

| | | | |
|---|---|---|---|
| 3,120,633 | 2/1964 | Genuit | 321—45 |
| 3,207,974 | 9/1965 | McMurray | 321—45 |
| 3,303,406 | 2/1967 | Bedford | 321—44 |
| 3,319,147 | 5/1967 | Mapham | 321—45 XR |

OTHER REFERENCES

"A Silicon-Controlled Rectifier Inverter with Improved Commutation," W. McMurray and D. P. Shattuck, November 1961, pp. 3, 4.

JOHN F. COUCH, Primary Examiner

W. M. SHOOP, Jr., Assistant Examiner

U.S. Cl. X.R.

219—10.75